(12) United States Patent
Fulghum et al.

(10) Patent No.: US 9,743,577 B1
(45) Date of Patent: Aug. 29, 2017

(54) PLANTER FOR RHIZOMES AND THE LIKE

(71) Applicant: Repreve Renewables LLC, Greensboro, NC (US)

(72) Inventors: Michael Edward Fulghum, Tarrytown, GA (US); Thomas Logan Fazio, Jupiter, FL (US); Curtis Jon Spell, Mocksville, NC (US); Tommy Lynn Sawyer, Clemmons, NC (US); William Travis Hedrick, High Point, NC (US)

(73) Assignee: AGgrow Tech, LLC, Greensboro, NC (US)

( * ) Notice: Subject to any disclaimer, the term of this patent is extended or adjusted under 35 U.S.C. 154(b) by 0 days.

(21) Appl. No.: 15/212,668

(22) Filed: Jul. 18, 2016

Related U.S. Application Data

(62) Division of application No. 14/170,572, filed on Feb. 1, 2014, now Pat. No. 9,392,740.

(51) Int. Cl.
| | | |
|---|---|---|
| A01C 5/06 | (2006.01) | |
| A01C 7/20 | (2006.01) | |
| A01C 15/00 | (2006.01) | |
| A01C 11/00 | (2006.01) | |
| A01C 7/18 | (2006.01) | |

(52) U.S. Cl.
CPC ............ *A01C 11/006* (2013.01); *A01C 5/062* (2013.01); *A01C 5/066* (2013.01); *A01C 7/18* (2013.01); *A01C 7/20* (2013.01); *A01C 7/208* (2013.01); *A01C 15/006* (2013.01)

(58) Field of Classification Search
CPC ........... A01C 5/062; A01C 5/066; A01C 5/06; A01C 5/00; A01C 7/18; A01C 7/20; A01C 7/208; A01C 7/00; A01C 15/006; A01C 15/005; A01C 15/00; A01C 11/006; A01C 11/00; A01B 49/06; A01B 49/04; A01B 49/00

See application file for complete search history.

(56) References Cited

U.S. PATENT DOCUMENTS

| | | | |
|---|---|---|---|
| 1,803,131 A | 4/1931 | Pierson | 460/89 |
| 3,026,001 A | 3/1962 | Landgraf | 221/42 |

(Continued)

FOREIGN PATENT DOCUMENTS

| | | | |
|---|---|---|---|
| FR | 2960121 | 11/2011 | |
| FR | 2960122 | 11/2011 | |
| JP | 2975819 | 4/1995 | ............. A01D 17/00 |

OTHER PUBLICATIONS

"Enhanced Vegetative Cultivation of Miscanthus Rhizomes," Gavin Maxwell Coolfm Partnership, UIUC Bioenergy Symposium 2012.

(Continued)

*Primary Examiner* — Christopher J Novosad
(74) *Attorney, Agent, or Firm* — MacCord Mason PLLC

(57) ABSTRACT

An apparatus for planting rhizomes includes a chassis having wheels to move in a primary direction over an area in which rhizomes are to be planted, the primary direction defining a forward and aft sense, a hopper on the chassis holds rhizomes to be planted, the hopper having a live bottom mounted to move rhizomes in the forward direction, a kickback bar at a forward side of the hopper lifts rhizomes at a forward face of the hopper, a leveling roller above the live bottom levels the height of rhizomes transported by the live bottom forward of the hopper, a barrel feed at a forward end of the live bottom to pull rhizomes from the live bottom, an accumulator below the barrel feed, a drop zone below the accumulator, and a chute with inner flaps from the drop zone oriented to deposit rhizomes in a furrow.

5 Claims, 11 Drawing Sheets

(56) References Cited

U.S. PATENT DOCUMENTS

| | | | | |
|---|---|---|---|---|
| 3,078,926 | A | 2/1963 | Ries | 171/14 |
| 3,365,869 | A | 1/1968 | Whiteley | 56/327.1 |
| 3,420,239 | A | 1/1969 | Lorenzen | 460/147 |
| 3,999,613 | A | 12/1976 | Porter | 171/14 |
| 4,008,826 | A | 2/1977 | Carree | 221/13 |
| 4,965,993 | A | 10/1990 | Butler et al. | 56/327.1 |
| 5,417,293 | A | 5/1995 | Leader | 172/721 |
| 6,499,419 | B1 | 12/2002 | Bussard | 114/274 |
| 6,722,297 | B1 | 4/2004 | Nelson, Jr. | 111/104 |

OTHER PUBLICATIONS

Miscanthus Planter Machinery, Manufacturers and Suppliers, W.H. Loxton, Ltd., retrieved from the internet May 2013.
"Planting and Managing Freedom Giant Miscanthus for Biofuel Using the Biomass Crop Assistance Program," USDA, NRCS, Jul. 2011.
"Planting and Growing Miscanthus," Best Practice Guidelines, Jul. 2007.
"Series GL cup planting machines," Grimme Harvesting Success, Potato Technology; undated, admitted prior art.
"Planting and Managing Giant Miscanthus as a Biomass Energy Crop," Technical Note No. 4, USDA, NRCS Jul. 2011.
"Demonstration of Giant Miscanthus Equipment," [on line] https://222.youtube.com/watch?v-VAQwG_PWnt0&feature=youtu.be, Mar. 10, 2011 [retrieved Nov. 18, 2015].
Rhizome, Root, Sprig Harvester, [on line] http://spriggerschoice.com/index_files/RHIZOMEROOTSPRIGHARVESTER.htm [retrieved Nov. 18, 2015].
Thierart Planteuse a Miscanthus (in French).

PLANTER FOR RHIZOMES AND THE LIKE

BACKGROUND OF THE INVENTION

Developments in the plant propagation and perennial crop production industry have generated the need for an efficient planting system. One arena of vegetative propagation includes planting live processed rhizomes, tubers, nodal stem cuttings, or cane pieces. The present invention has been developed for these types of plant propagules, such as Rhizomes of *Miscanthus* or *Arundo*; Cane pieces such as sugar cane, Miscanes, Napiergrass, Energy Cane and crops such as Potatoes and Horseradish. Giant *Miscanthus* (*Miscanthus giganteus*) (Mxg) will be discussed herein to exemplify the use of the invention, but the machine and its use are not limited to Giant *Miscanthus*, and references to rhizomes herein should be interpreted to include such tubers, nodal stem cuttings or cane pieces. Much background information on the cultivation of *Miscanthus* can be obtained from "Planting and Managing Giant *Miscanthus* as a Biomass Energy Crop," U.S. Dept. of Agriculture, Natural Resources Conservation Service, Plant Materials Program, Technical Note No. 4, July 2011, the entire disclosure of which is incorporated herein by reference (hereinafter referred to as "NRCS publication.)

Mxg used in this crop demonstration is a sterile hybrid, warm-season perennial grass that is native to Asia. The variety is commercially known as 'Freedom' (See U.S. Plant Patent Publication PP 23,489, the entire disclosure of which is incorporated herein by reference). It can produce large amounts of biomass, across several temperate latitudes, due to its high range of adaptability in both warm and cool climates, and in various soil types.

Sterile Mxg propagates and grows from rhizomes, and is becoming widely accepted for various agriculture and bio-renewable products. Underground rhizomes can range from a few (20-40) to several hundred per plant depending on age, growing environment, and genetics of the individual genotype or clone. These parameters are the focus of efforts in regards to growing, digging rhizomes for seeding new fields, processing of rhizomes, and planting the crop.

Solid and efficient establishment of any vegetative propagated crop is to for the crop's success. Challenges in the establishment of rhizome planted crops like Mxg include weed competition, and provision of healthy viable rhizomes, planting date, and moisture availability. It is most important that stand density and subsequent plant populations are adequate for optimizing yield. Dense stands require little or no weed control after the establishment year.

DESCRIPTION OF PLANT MATERIAL

In general, if not directly transplanted from rhizome harvest, rhizomes can be stored and not lose viability for a period of time, depending on storage conditions. Proper temperature and moisture levels during storage are may be critical to maintaining viability. Fields typically can be planted between February and June, depending upon latitude, soil temperature and soil moisture level, while being mindful that frost damage can occur. Rhizomes should be planted between 3 and 4 inches deep in moist soil. Planting rates can vary, depending upon many factors. The desired final population is between 6000-10,800 plants per acre, with the quantity depending on soil quality and water availability. This usually requires planting a minimum of 6,000 rhizomes per acre. Recommended spacing varies between 36-inch rows by 36-inch spacing; 30-inch rows with 30-inch spacing; 30-inch rows by 24-inch spacing; or 24-inch rows by 24-inch spacing, depending on plant population density required for an optimal stand. Modified corn planters, potato planters, carousel planters and vegetable planters have been recommended to be used to plant rhizomes. These recommendations are not of the device described herein. After planting rhizomes, the field should be rolled to ensure good soil contact with the rhizomes.

Giant *miscanthus* can be harvested with a silage harvester, or mowed and baled. Regardless of the harvest method used, a 2-4 inch stubble height is recommended to maximize yield, but avoid picking up the leaf litter.

Rhizome Quality—

Age of mother plants affects rhizome quality and rhizome quality affects stand establishment. In one European study cited in the NRCS publication, survival was 88 percent with rhizome pieces from 5-year-old plants compared to only 25 percent for rhizomes from 1-year-old plants and 52 percent for rhizomes from 9-year-old plants. Preliminary work in Mississippi has shown better rhizome quality from 2-year-old plants than from 4-year-old plants. These studies indicate that quality of rhizome increases with mother plant age, but only up to a certain point.

For field planting, according to the NRCS publication, a plantable quantity of rhizomes should weigh about 1.5 to 2 ounces (50 g) and the rhizomes should be about 4 to 5 inches long, but can be smaller depending on variety and species type where smaller or larger rhizomes maintain acceptable viability. Rhizome quantity per drop is adjusted to ensure good establishment while reducing the risk of amount to excess surplus and waste. For Mxg, good quality rhizomes pieces can be branched or unbranched pieces, and should appear scaly and buff colored. Typically they will have small feeder roots attached. Those feeder roots can entangle with the roots of adjacent rhizomes in a bulk container.

Rhizome Yield—

Age of mother plant also affects rhizome yield according to the NRCS publication. Hand dug, 1-year-old plants were found to produce 7 to 10 harvestable rhizomes, 2-year-old plants produced 25 to 30 harvestable rhizomes, and 3-year-old plants produced 75 to 80 harvestable rhizomes (Pyter et al. 2009). Yield of mechanically dug rhizomes is not as high. The European rule of thumb is that for each acre of 4-year-old *miscanthus* mother field, one can expect enough rhizomes to plant 8 to 10 acres.

Digging Considerations—

Rhizomes can be dug anytime in the fall or winter period after the plants have senesced and biomass removed. However, the most common time for harvesting for field planting is in the spring prior to shoot emergence. Rhizomes should be used as soon as possible after digging, but they can be stored temporarily if kept cool and moist. This can be accomplished by covering the rhizome heap with moist soil, but it is critical that the rhizomes not be allowed to dry out or go through a heat. Additionally, care should be taken to not let rhizomes dry out during transport.

Depending on planting method used, the rhizomes also may need to be cleaned and sized. Sizing is particularly critical to ensure rhizomes pieces will feed through the transplanter openings. Follow planter manufacturer's directions or do test runs to determine what size rhizome pieces are best used for the variety, and or species to be planted.

Planting Depth—

Regardless of the type of planting equipment used, giant *miscanthus* rhizomes should be planted between 2 and 4 inches deep.

Planting Rate—

Plant populations between 4,000 and 16,000 plants per acre have been evaluated. Higher numbers provide earlier canopy closure and weed control, but are more expensive to establish with relatively little improvements in long-term yield. However, year 1 and 2 establishment yields have shown improvement with the higher stand densities and require less overall weed control. The consensus among researchers is that the desired final population should be between 4,000 and 5,000 plants per acre. Since large rhizome (1.5-2 oz) survival usually averages 60 to 70 percent, this means 6,000 to 7,000 rhizomes per acre are needed to get the final recommended stand. The higher rate should be used for less optimum conditions (e.g., soils with lower water holding capacity, higher expected weed competition, late planting, etc.). With irrigation, establishment survival should be higher, and lower rates may be practical. However, the quality of the rhizome is important in any condition.

Row Spacing—

According to one recommendation, in the Midwest plant using 30-inch rows with 30-inch spacing between plants. This is based on two factors. One is the need to use up to 7,000 rhizomes per acre to get the desired final stand density, and the second is that research has shown that actually leaving equal space around each rhizome or plug gives better first season growth. Given variability in the planting equipment available, slight variations in the 30- by 30-inch spacing would be reasonable as long as plant population is maintained.

Planting Methods—

Most research stands of giant *miscanthus* have been established by hand planting rhizomes as space plants or by dropping rhizomes into furrows that were subsequently covered up. Broadcast planting followed by disking in and packing was the earliest mechanical method of planting rhizome pieces, but issues with consistent planting depth and the need for tillage to control weeds prompted the modification and use of standard row planting equipment.

Modified corn drills and potato planters have been used to plant rhizomes, and vegetable or tobacco planters have been used for transplants or plugs. European and American equipment manufacturers have actively been modifying and/or developing planting equipment to plant both rhizome pieces and transplants.

Table 1 lists some of the manufactures advertising specialized giant *miscanthus* planting equipment for the United States or Canadian market in 2011. In the case of rhizomes, the field should be rolled after planting to ensure good soil contact and few air spaces unless otherwise directed by the planter manufacturer. Irrigation is recommended after planting if transplants or plugs are used, and additional applications may be warranted the first growing season. If available, irrigation also may be warranted to speed the establishment and, thus, first-year survival of rhizome-planted field

TABLE 1

Dedicated giant miscanthus digging and planting equipment available for United States/Canadian market in 2011

| Available from | Web address |
|---|---|
| WHL | miscanthusplanter.com |
| Spriggers Choice | spriggerschoice.com/index_files/ miscanthuspropergationmachinery.htm |
| Cool Fin Partnership | bioenergyfeedstocks.igb.uiuc.edu/2010/ppt/maxwell.pdf |

Despite these advances in the art of *miscanthus* cultivation, there remains a need for improved machinery and processes for retrieving rhizomes from mature plants, processing them to produce suitable planting stock, and replanting the rhizome planting stock in fields. A preferred digger is disclosed in our co-pending application entitled "Digger for Rhizomes and the like", Ser. No. 14/170,573, filed on Feb. 1, 2014. A preferred processor is disclosed in our co-pending application entitled "Processor for Rhizomes and the like", Ser. No. 14/170,578, filed on Feb. 1, 2014. The disclosures of those two applications are incorporated herein by reference. The present invention is advantageously used in combination with those two inventions, but they are not required.

Table 2 indicates various density adjustments per acre associated with row and plant spacing.

TABLE 2

Effect of planting arrangement on the number of rhizomes or plugs per acre

| Row spacing Within row spacing Inches | | No. rhizomes or plugs/acre |
|---|---|---|
| 30 | 24 | 8,700 |
| 30 | 30 | 7,000 |
| 36 | 24 | 7,000 |
| 36 | 30 | 6,000 |
| 36 | 36 | 5,000 |

SUMMARY OF THE INVENTION

The present invention fulfills one or more of these needs in the art by providing a method and apparatus for planting rhizomes. The apparatus includes a chassis having wheels to move in a primary direction over an area in which rhizomes are to be planted, the primary direction defining a forward and aft sense. A hopper on the chassis holds rhizomes to be planted, and the hopper has a live bottom mounted to move rhizomes in the hopper in the forward direction. A kickback bar at a forward side of the hopper is mounted to move to lift rhizomes at a forward face of the hopper. A leveling roller above the live bottom levels the height of rhizomes transported by the live bottom forward of the hopper. A barrel feed at a forward end of the live bottom pulls rhizomes from the live bottom. An accumulator is positioned below the barrel feed, and a drop zone is positioned below the accumulator. A chute from the drop zone is oriented to deposit rhizomes in a furrow.

Typically, the chassis has a forward-positioned plow so the chute from the drop zone positions rhizomes in a furrow formed by the plow and a covering disk aft, to cover rhizomes in the furrow.

The live bottom of the hopper may include a barrier to prevent rhizomes from falling below the barrier; two endless chains mounted for forward movement above the barrier and on opposite sides of the hopper, with slats extending between the chains to move forwardly as the chains move forwardly.

The kickback bar may include two endless chains mounted for movement in an upward direction above the live bottom and on opposite sides of the hopper. Slats extending between the chains move upwardly as the chains move forwardly, and the slats have flaps that extend rearwardly over the live bottom to lift and loosen rhizomes at a forward end of the hopper. The leveling roller above the live bottom typically extends across the hopper and has longitudinal bars. The leveling roller may be positioned above the live bottom a distance corresponding to a rhizome length, to form a nip to pinch rhizomes at the forward side of the hopper and to prevent more than a desired quantity of rhizomes at the forward side of the hopper from discharging from the hopper. The barrel feed at a forward end of the live bottom to pull rhizomes from the live bottom may take the form of a roller extending across the chassis above and forward of the live bottom. The roller has radially extending barbs on its surface, enabling the barbs to engage small quantities of rhizomes discharging from the forward side of the hopper. The leveling roller and the barrel feed preferably cooperate by enabling the barbs to engage small quantities of rhizomes discharging from the forward side of the hopper, so when the leveling rollers pinch the material, the barrel feed removes or tears an evenly distributed amount from the live bottom.

The accumulator below the barrel feed may include a rotatable hub with a plurality of blades extending radially outward of the hub, so that the blades define separating quadrants for holding plantable amounts of rhizomes and preventing the rhizomes from entangling with rhizomes in adjacent quadrants. Typically, the accumulator is mounted above a substantially solid surface that has a hole communicating with the chute from the drop zone oriented to deposit the plantable amount of rhizomes in a furrow.

One or more motors and controls are usually included so that when the chassis wheels move in the primary direction, the live bottom, a kickback bar, leveling roller, barrel feed, and accumulator move at coordinated speeds to feed rhizomes to the front of the hopper at a pace to feed plantable amounts of rhizomes to the chute so they fall into a furrow at a controlled spacing.

The chassis preferably has a plurality of accumulators and chutes positioned in a line that extends transversely to the primary direction and spaced at 33 inches to 39 inches apart on center. As discussed, herein below, in other embodiments, row spacing flexibility can be built in.

Preferably, the kickback bar, leveling roller and barrel feed are driven by independently controllable motors. Preferably, the chute includes an endless belt with flaps to lower rhizomes to the furrow at a controlled pace and the live bottom, accumulator and the endless belt in the chute are commonly driven in coordination with the ground speed of the apparatus.

The flaps move at a rate in coordination with the ground speed to control spacing of rhizome placement in the furrow. In some embodiments, the rate of flap movement can be adjusted to control spacing of rhizome placement in the furrow. In embodiments the spacing of flaps on the endless belt can be adjusted to control spacing of rhizome placement in the furrow.

Preferably, the number and position of the accumulator, drop zone, and chutes across a width of the chassis can be adjusted to allow varying planting row widths.

The method of planting rhizomes includes loading a quantity of rhizomes in a hopper on a chassis, moving the chassis over a field to be planted, while opening furrows in which rhizomes are to be planted. As the chassis moves, the rhizomes in the hopper are transported to a discharge nip. The method includes loosening the rhizomes from one another, slightly upstream of the discharge nip, pinching the rhizomes at the discharge nip, and mechanically pulling plantable amounts of rhizomes forward of the discharge nip, while preventing the plantable amounts from re-entangling with other rhizomes. Then the method includes dropping the plantable amounts of rhizomes in the opened furrows, and covering the dropped rhizomes with soil.

Dropping the plantable amounts of rhizomes in the opened furrows preferably includes dropping a plantable amount of rhizomes in a controlled spacing forward of a just-prior planting of a plantable amount of rhizomes, and particularly preferred is a spacing of 33 inches to 39 inches.

BRIEF DESCRIPTION OF THE DRAWINGS

The invention will be better understood by a reading of the Detailed Description of the Examples of the Invention along with a review of the drawings, in which.

DETAILED DESCRIPTION OF EXAMPLES OF THE INVENTION

Figure 1:
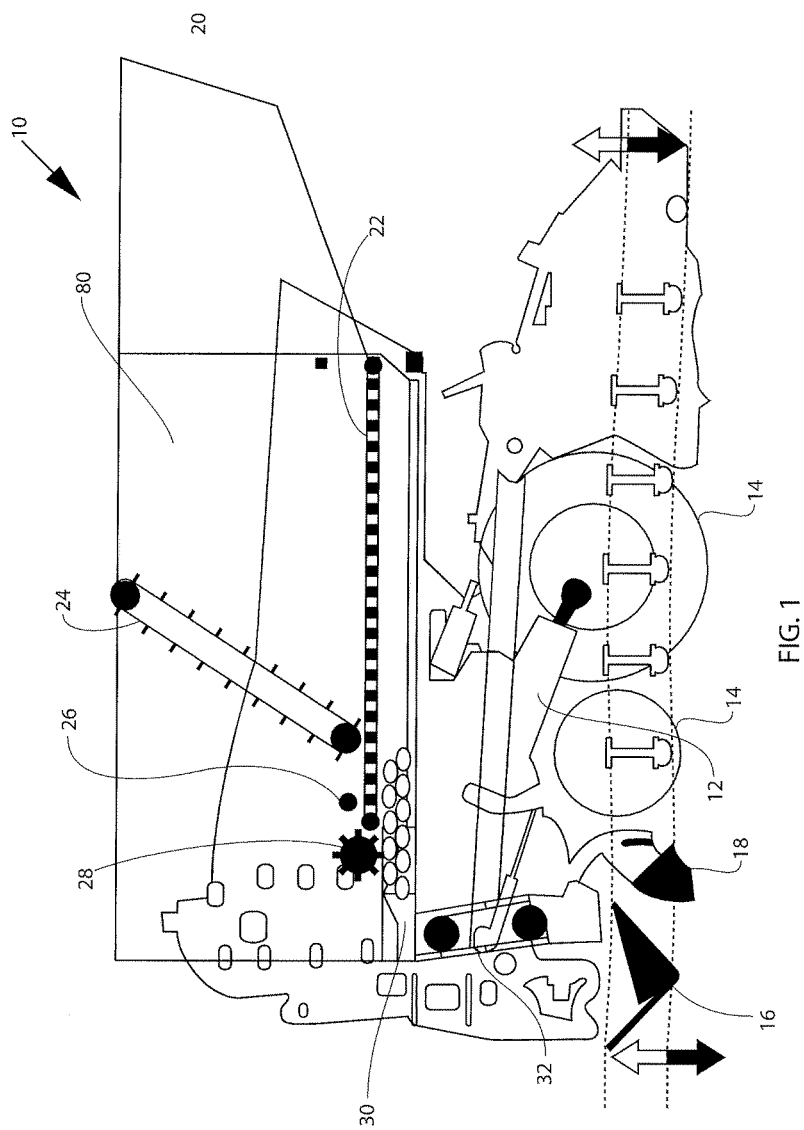
FIG. 1 is a side schematic view of an embodiment of a *miscanthus* or other rhizome planter in accordance with the invention.

The apparatus can be built as a modified potato planter, and a suitable potato planter is available from Grimme Landmaschinenfabrik GmbH & Co. KG; Hunteburger Straβe 32; 49401 Damme, Germany.

An apparatus for planting rhizomes has a chassis having wheels to move in a primary direction over an area in which rhizomes are to be planted, the primary direction defining a forward and aft sense. As noted above, the apparatus and its use will be described in connection with planting rhizomes, but tubers, nodal stem cuttings, or cane pieces can be planted, as well, such as Rhizomes of *Miscanthus* or *Arundo*; Cane pieces such as sugar cane, Miscanes, Napiergrass, Energy Cane and crops such as Potatoes and Horseradish. References to rhizomes in the discussion that follows are also applicable to such other items to be planted.

The chassis is modified from a planter for potatoes and has an array of plows forward and covering disks located aft. A hopper on the chassis holds rhizomes to be planted and has a live bottom mounted to move in the forward direction. A kickback bar in the form of a vertically arranged chain on sprockets that has protruding arms at a forward side of the hopper lifts and loosens the rhizomes at the forward face of the hopper. A leveling roller above the conveyor belt levels the height of rhizomes transported by the conveyor belt forward of the hopper, and a barrel feed at a forward end of the conveyor belt pulls rhizomes from the conveyor belt. An array of accumulators below the barrel feed each has a rotary array of blades to selectively control an individual rhizome or cluster of rhizomes and a drop zone including a hole in the floor of the bed through which is fed the controlled rhizome by the accumulator. A chute from the drop zone is oriented to deposit rhizomes in a furrow cut by the plows, where they can be covered by the disks. Preferably, flaps within the chute control the precise drop and spacing of the rhizomes or other material to be planted. The flaps can be adjusted to control the spacing between drops, and hence the number of drops per acre. The flaps are timed with the rotary array blades via ground controlled drive. By changing the sprocket size on the ground drive, the timing and spacing can change. The rear wheels compact the soil around the covered rhizome.

The invention has the benefit of handling the fragile rhizomes gently enough to avoid breaking them and doing so without the need for humans to handle them. This is not an easy undertaking since the rhizomes can entangle with one another. In addition, an embodiment of the machine is designed with four chutes on 36 inch centers, and the speed of the machine during planting operations is correlated with the rhizome feed rate, so that rhizomes are planted every 36 inches of machine travel, resulting in optimum spacing of the plants as they grow in place for, perhaps, decades. Other spacings can be provided for.

The kickback mechanism, which is adjustable, is a reverse rotating chain with bars that control the amount of material allowed to pass to the forward edge of the feed belt. The kickback mechanism also keeps material from becoming lodged in place, and loosens the rhizomes to allow good control. Similar apparatus has been used over the past 40 years on sprigging machines. The rollers positioned above the forward edge of the feed belt are spring loaded, chain driven and used to apply moderate pressure against the live bottom, in a sense to pinch the material so that the barrel feed will pull an evenly distributed amount from the live bottom. Otherwise, since the material is bound together by the feeder roots, the barrel feed would pull or tear uneven amounts or clumps as it pulls the material from the live bottom, causing an uneven amount of material to drop into the chutes.

Figure 10:
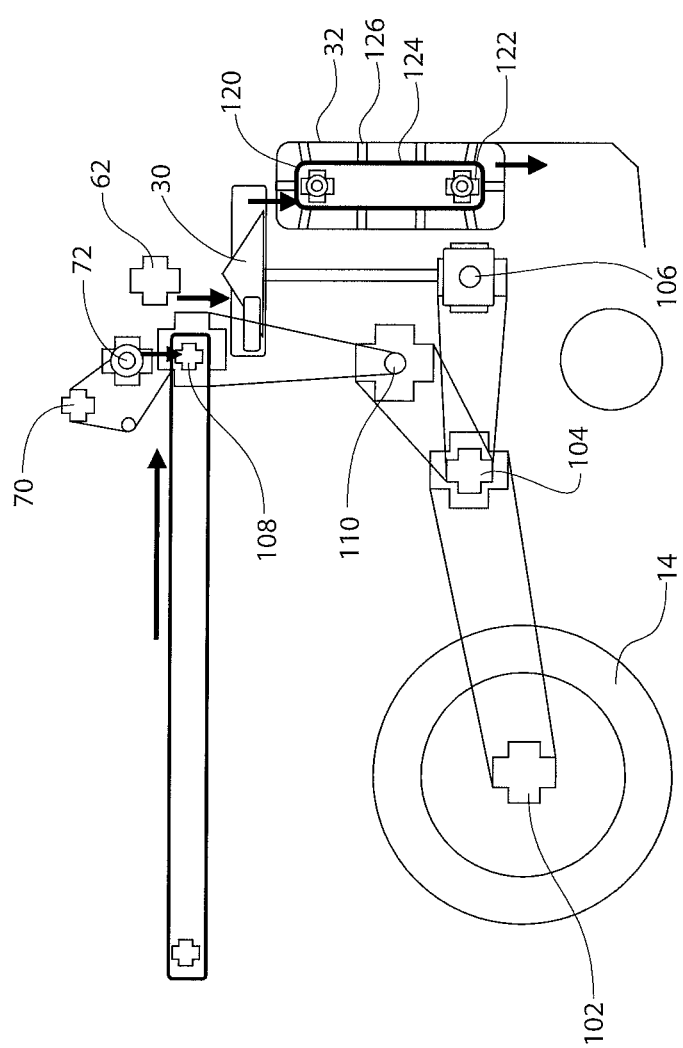
FIG. 10 is a schematic view of the drive mechanism of various rotating components, and also shows a schematic sectional view of the chute.

The machine is therefore automated and requires no human hand sorting. The rhizomes are positively fed from the live bottom to the ground by paddles or belt flaps 126, as seen in FIG. 10. Other machines for planting rhizomes have a feed belt from which the material falls freely to the ground inside or without a chute.

Figure 2:
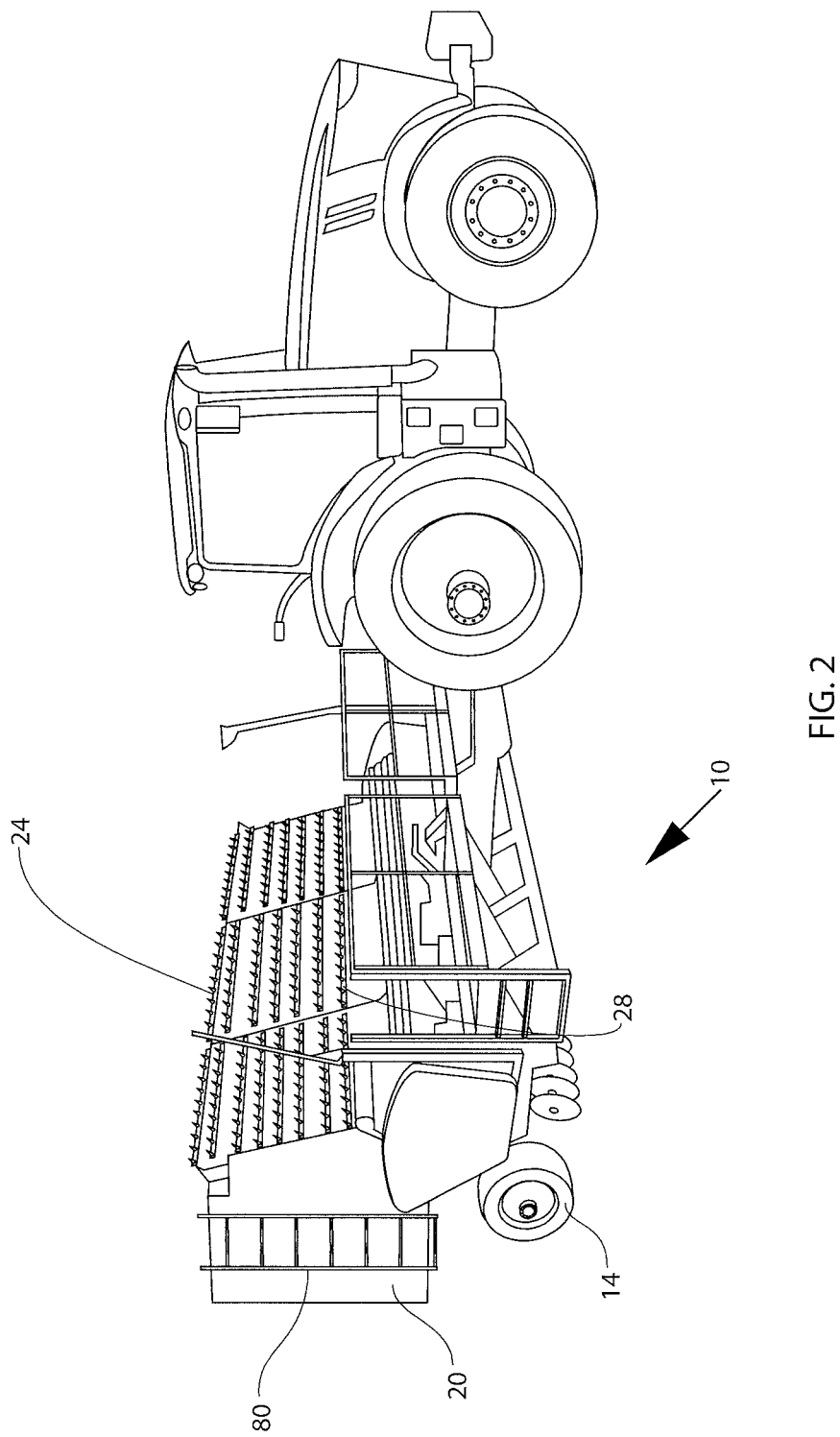
FIG. 2 is a perspective view of a rhizome planter in accordance with the invention, differing from FIG. 1 primarily in the size of the hopper for rhizomes to be planted.

Referring to FIG. 1, an apparatus 10 in accordance with an embodiment of the invention is shown in position to move in a primary direction to the left. The apparatus as noted is built upon a potato planter chassis. A hopper 20 is provided on the chassis. The ground is opened to a furrow by a plow 16 on the front of the chassis, so that plantable quantities of rhizomes can be positioned in the furrow as the planter progresses. The planted rhizomes can then be covered with conventional covering disk 18 mounted on the chassis 12. The chassis 12 has conventional wheels 14 and is conventionally pulled by a tractor, as seen in FIG. 2. The version shown in FIG. 1 has an enlarged sized hopper. FIG. 2 shows a hopper of a more condensed size.

The hopper has sidewalls 80 and a rearwall to help contain the rhizomes within the hopper. A live bottom 22 is provided along the bottom of the hopper to drive the rhizomes forwardly in the primary direction in the hopper. A kickback bar 24 toward the front of the hopper is more or less vertical but slightly slanted rearwardly. The kickback bar lifts the front end of the mass of rhizomes advancing on the live bottom, to move some of them rearwardly and to loosen the rhizomes that have a tendency to become entangled with one another. The kickback conveyor located in the hopper towards the front of the live bottom helps to level the pile of rhizomes moving forward on the live bottom.

Forward of the kickback bar is a leveling roller 26 which is a cylinder having ribs that extend axially along its surface. Forward of the leveling roller 26 and, in fact, forward of the live bottom, is a barrel feed or spinner 28. The barrel feed or spinner evens out the distribution of the material from the live bottom to the accumulators (also called accumulators) in a thrashing motion. The accumulator or accumulator accumulates the material into controllable groups to aid in increasing the accuracy of spacing between rhizome drops. The barrel feed 28 and leveling roller 26 interact to form a pinch point and pinch the rhizomes against the live bottom. The leveling or compression roller only adds resistance to the material so that large clumps are not pulled as the spinner or barrel feed thrashes the leading edge of the material from the live bottom. The barrel feed blades rip selected bunches of rhizomes to form a plantable quantity. A plantable quantity of rhizomes preferably weighs about 1.5 to 2 ounces (50 g) and the rhizomes are about 4 to 5 inches long. The accumulator or accumulator 30 isolates each selected bunch or plantable quantity from one another to prevent re-entanglement. Accumulator 30 rotates the plantable quantity of rhizomes over a chute 32 where they fall and are guided by paddles downward to the ground. The accumulator 30 is structured as a hub with blades, four blades being shown in the illustrated embodiment, but other numbers may be substituted. The hub is mounted for rotation, causing the blades to rotate under the barrel feed or spinner, so that rhizome bunches released by the spinner fall into a volume between adjacent blades in controllable groups for accurate spacing when planted. The rotational speed of the hub is preferably controlled to be in synchronization with the speeds of the live bottom 22 and flap within the chute 32 below.

The blades of the accumulator define separating quadrants for holding plantable quantities of rhizomes and preventing the rhizomes from entangling with rhizomes in adjacent quadrants. As used herein, the word "quadrant" is not limited to one of four segments on the accumulator; for example, if the accumulator has only three blades, there can be three quadrants. If it has five blades, there can be five quadrants.

Figure 3:
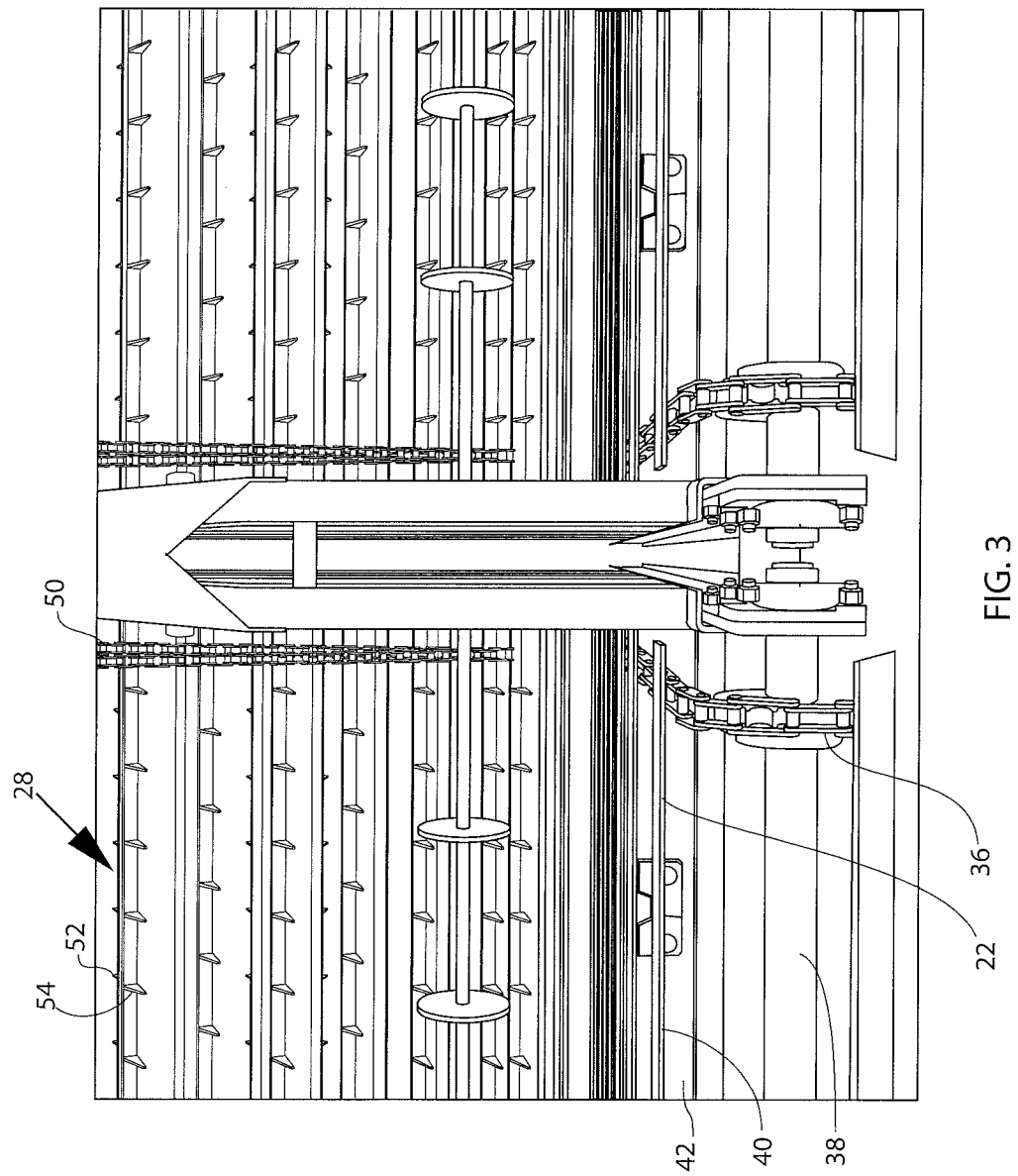
FIG. 3 is a view inside the hopper from the rear, showing the live bottom to transport rhizomes to the leveling roller, and also showing the kickback bar.

FIG. 3 is a view from the rear of the hopper showing the live bottom 22. It consists of an upper run and a lower run, with the upper run passing over a barrier layer 42 to prevent the rhizomes from falling below the hopper. The upper run and the lower run together form an endless loop mounted on chains 36 driven by a sprocket on an axle 38. Extending between the chains are slats 40. The chains 36 are driven so that the course on the upper side of the barrier 42 moves forwardly in the primary direction (into the plain of the paper in FIG. 3).

FIG. 3 also shows the kickback bar made up of endless chain 50 having slats 52. The direction of motion of the chains on the kickback bar during operation is to be upward on the rear face of the frontwall of the hopper. Each slat 52 has a number of arms or barbs 54 extending out from it. The barbs can penetrate a mass of rhizomes at the forward end of the live bottom to reduce the quantity passing past the kickback bar and also to loosen and disentangle the rhizomes.

Figure 4:
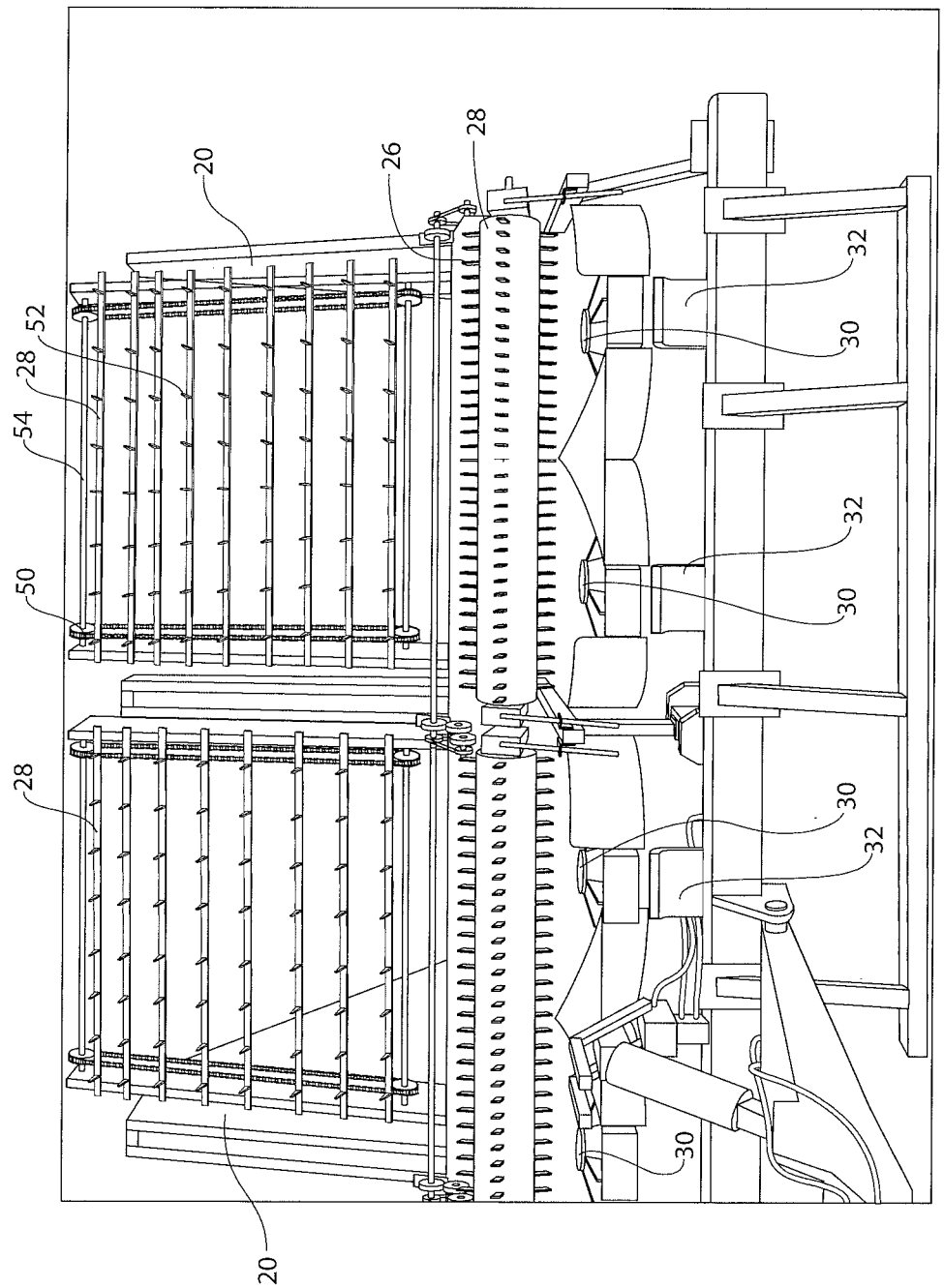
FIG. 4 is an enlarged top view of the front of the planter, showing side-by-side kickback bars, barrel feeds and chutes, along with the tow structure.

FIG. 4 shows a view of the machine from the front. Again, the kickback bar 24 can be seen with its chain 50, slats 52 and barbs 54. FIG. 4 also shows the leveling roller 26 and the barrel feed 28 extending across the width of the hopper. As seen in FIG. 4, and in several other figures, the hoppers on the machine can be segmented, with each having their own individual kickback bar and live bottom. FIG. 4 shows four accumulators 30, two for each of the two hopper segments shown. It also shows a chute 32 extending below each accumulator 30. The leveling roller 26 and barrel feed 28 cooperate to dispense plantable quantities of rhizomes into the accumulators which rotate and therefore periodically position the quantity of rhizomes over the chute 32, where they are lowered by a paddle mechanism to be planted. As noted below, the position and tension on the roller 26 can be adjusted, allowing fine-tuning of the amount of rhizomes dispensed.

Figure 5:
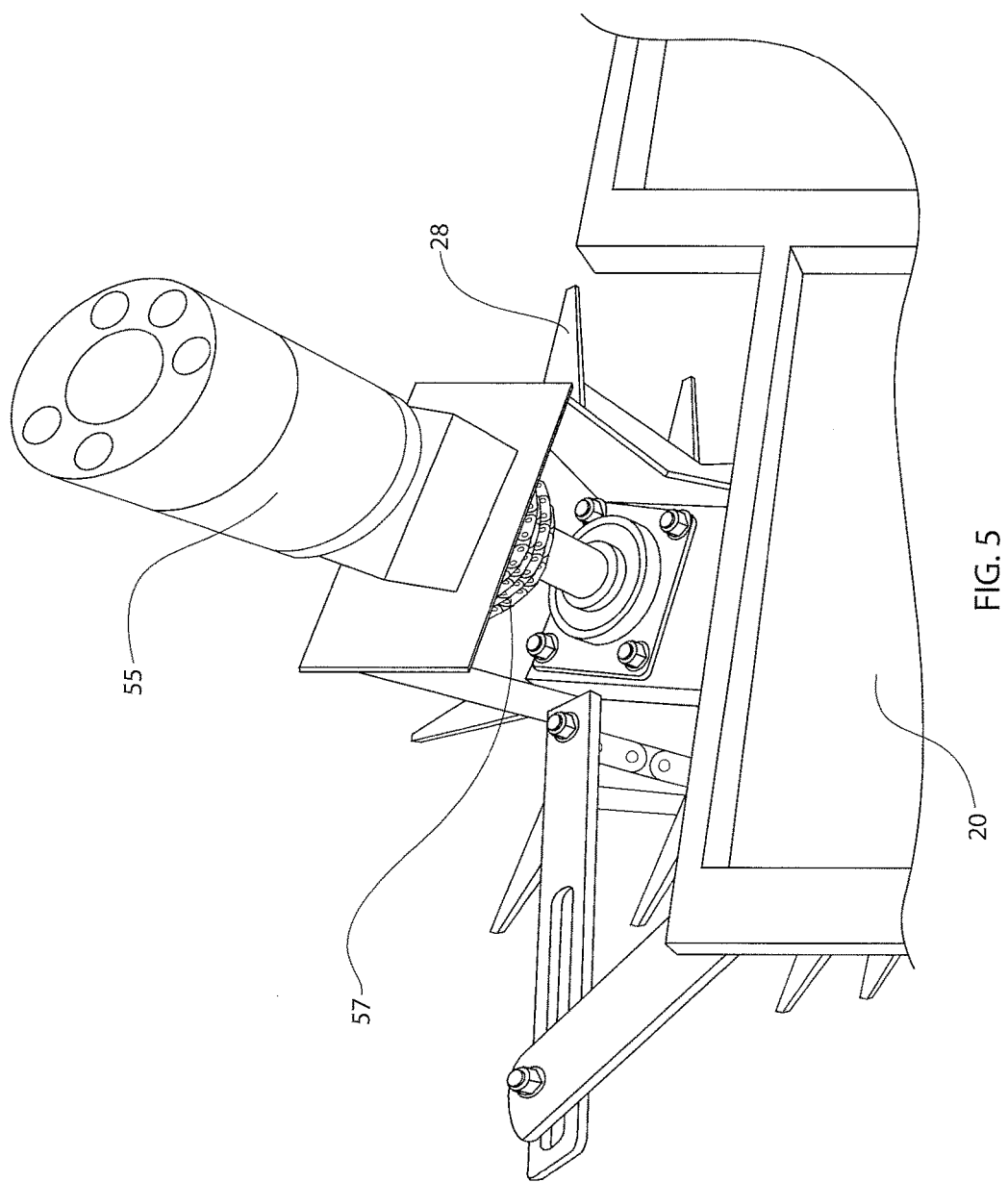
FIG. 5 shows the drive motor for the kickback bar and details of the kickback bar structure.

FIG. 5 shows the top of the kickback bar with a sprocket 57 and a drive motor 55. It also shows the barbs 54.

Figure 6:
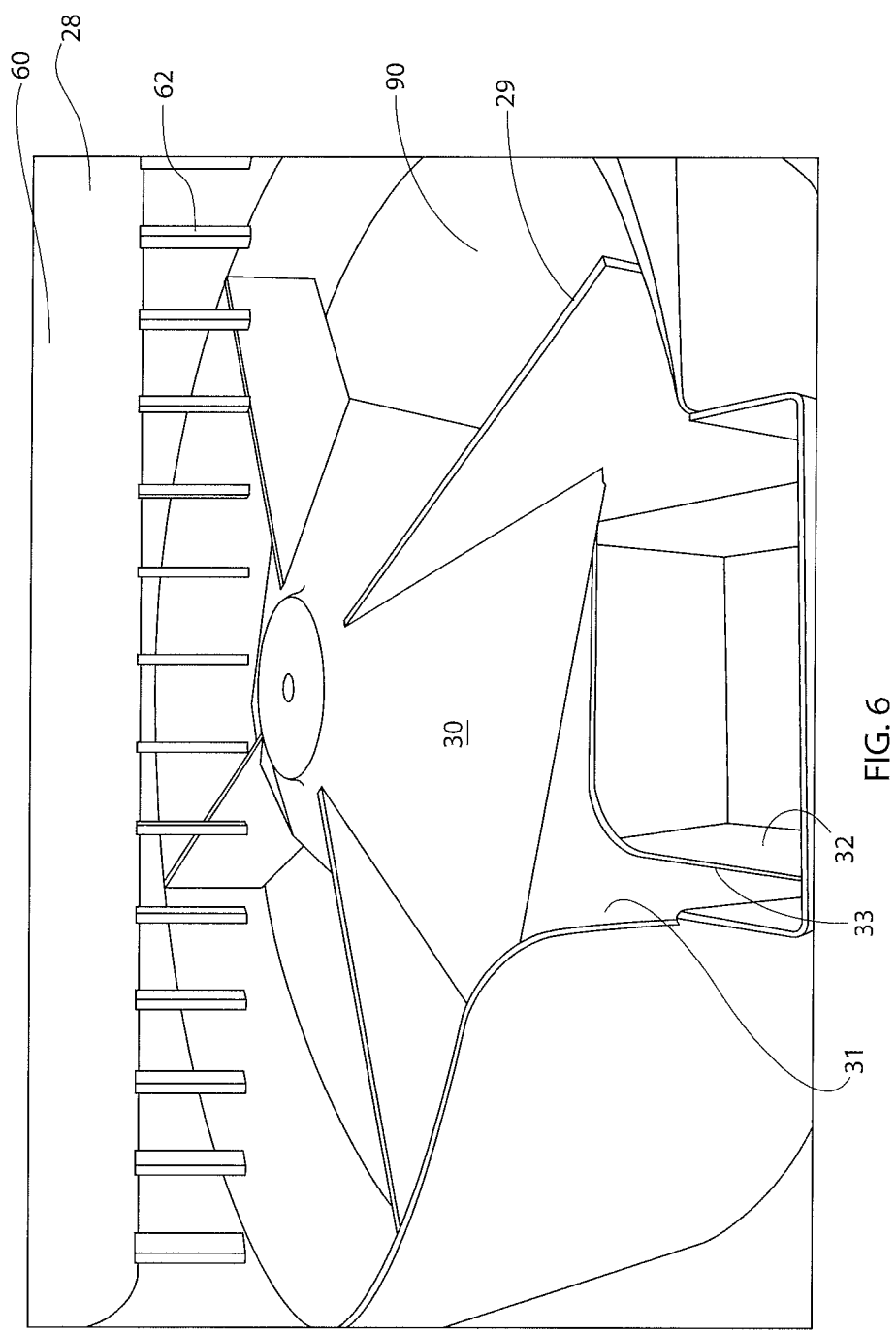
FIG. 6 is a front perspective view of the barrel feed, accumulator and chute top of the embodiment of FIG. 2.

FIG. 6 shows the accumulator 30 with radially extending blades 29. The core of the accumulator 30 is preferably of a pyramidal or other sloped shape, so that as the accumulator rotates, rhizomes migrate radially outwardly. They may be tumbled and carried over a surface 90, but eventually will reach an opening forming the top of the chute 32, where they fall to be planted. As seen, the accumulator 30 does not extend radially outwardly as far as the blades, leaving the exposed area over the surface 31 for the travel of the rhizomes.

Figure 7:
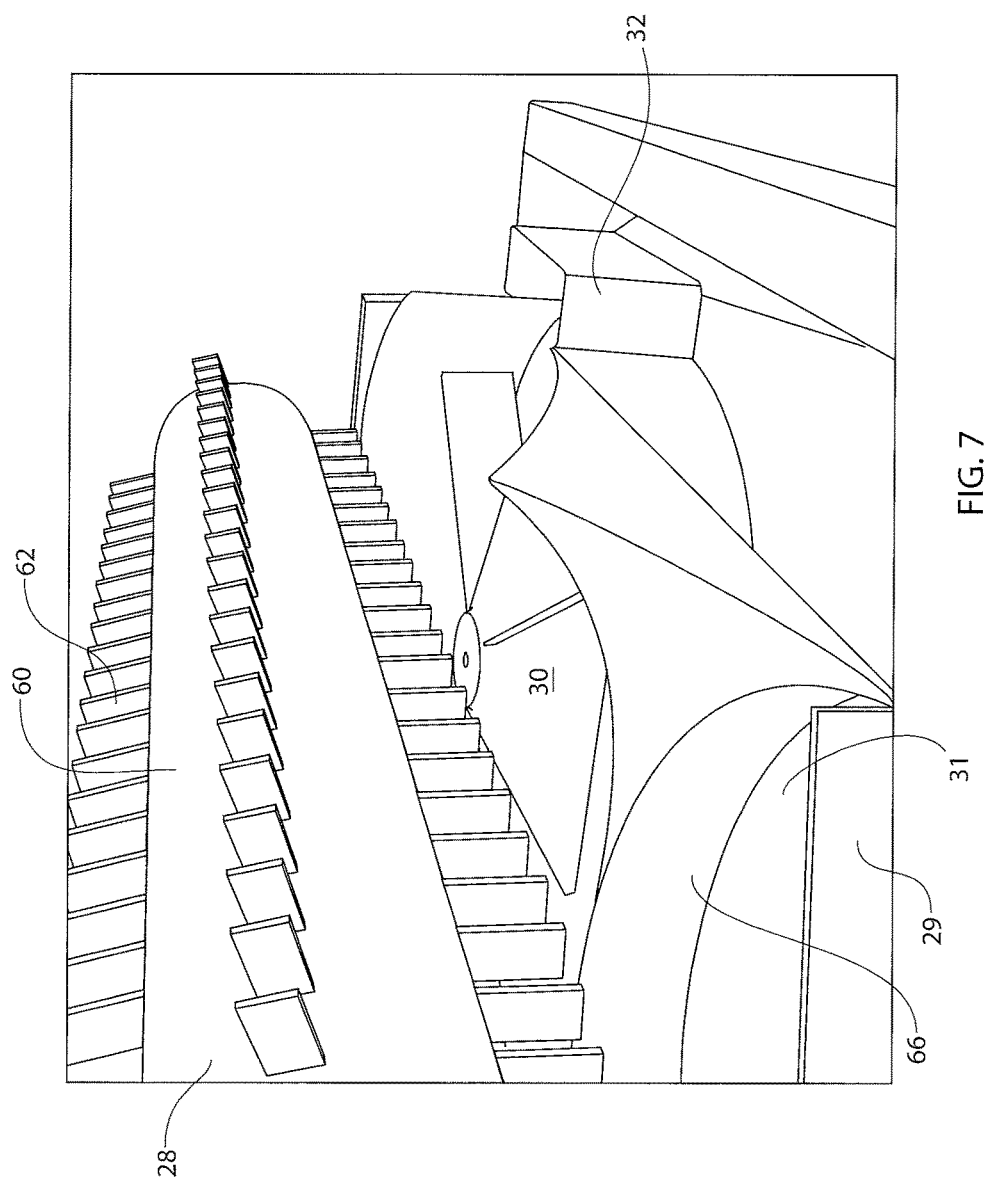
FIG. 7 is a side perspective view of the barrel feed, accumulator and chute top of the embodiment of FIG. 2.

FIG. 7 shows an alternate, angular view of the accumulators 30 and shows the area around the surface 31 as having a cylindrical barrier 66 to help contain the rhizomes. The barrel feed 28 is located above the accumulators 30 so any rhizomes pulled by the barrel feed will fall to the area within the surface 31, for control by one of the accumulators 30.

Figure 8:
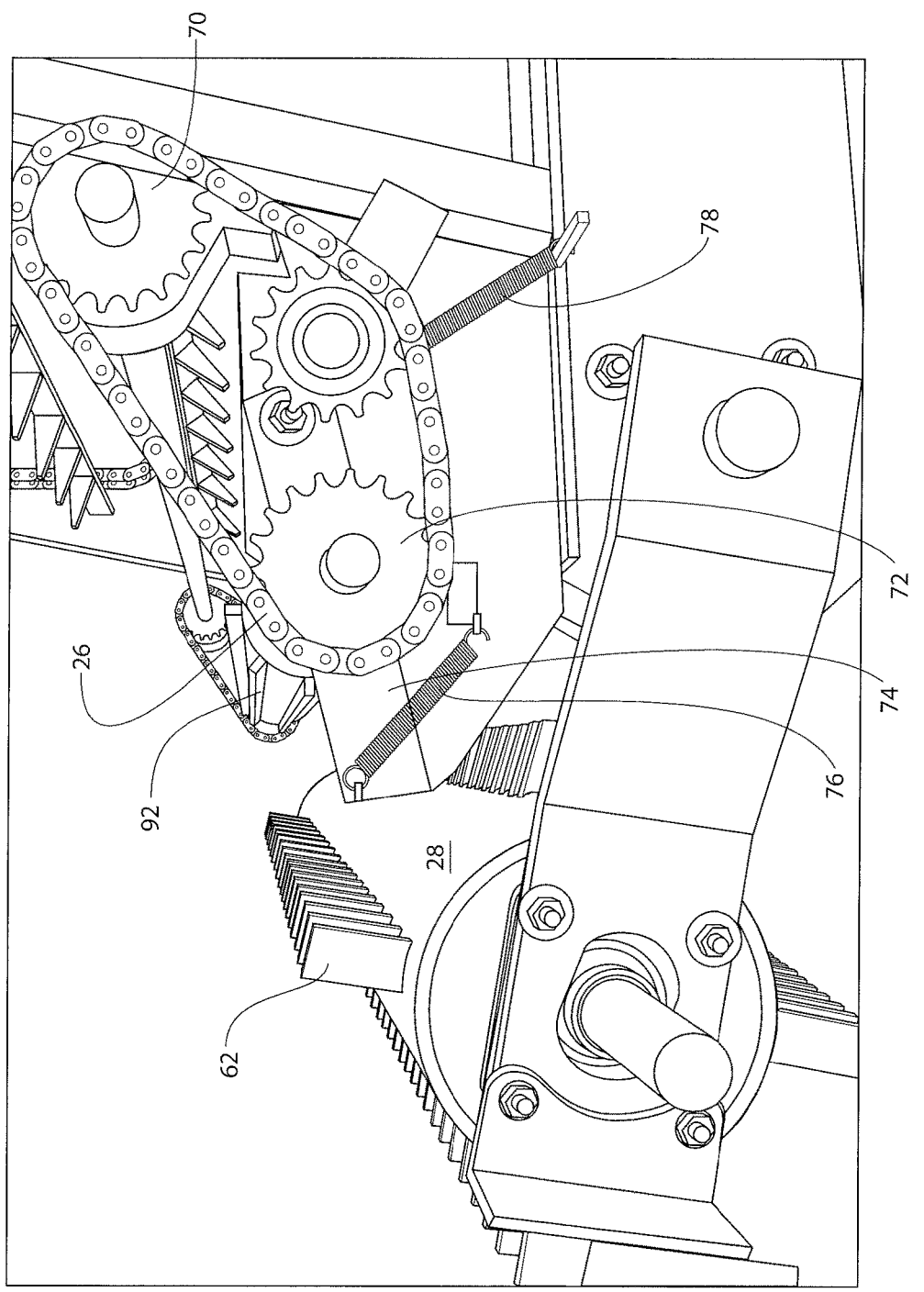
FIG. 8 is a side view of the timing chain for parts of the embodiment of FIG. 2, and showing the leveling roller and barrel feed.

FIG. 8 shows a side view of the leveling roller 26 and shows its axially extending surface ribs 92. These ribs interact with the forward end of the live bottom to position a small quantity of rhizomes that can be pulled away from the nipped or pinched area by the blades 62 of the barrel feed. FIG. 8 also shows that the leveling roller is journaled in a sprocket 72 which in turn is mounted in a plate 74 which is urged downwardly by springs 76 and 78. Thus, the roll 26 is resiliently urged downwardly to the pinch point for the rhizomes.

Figure 9:
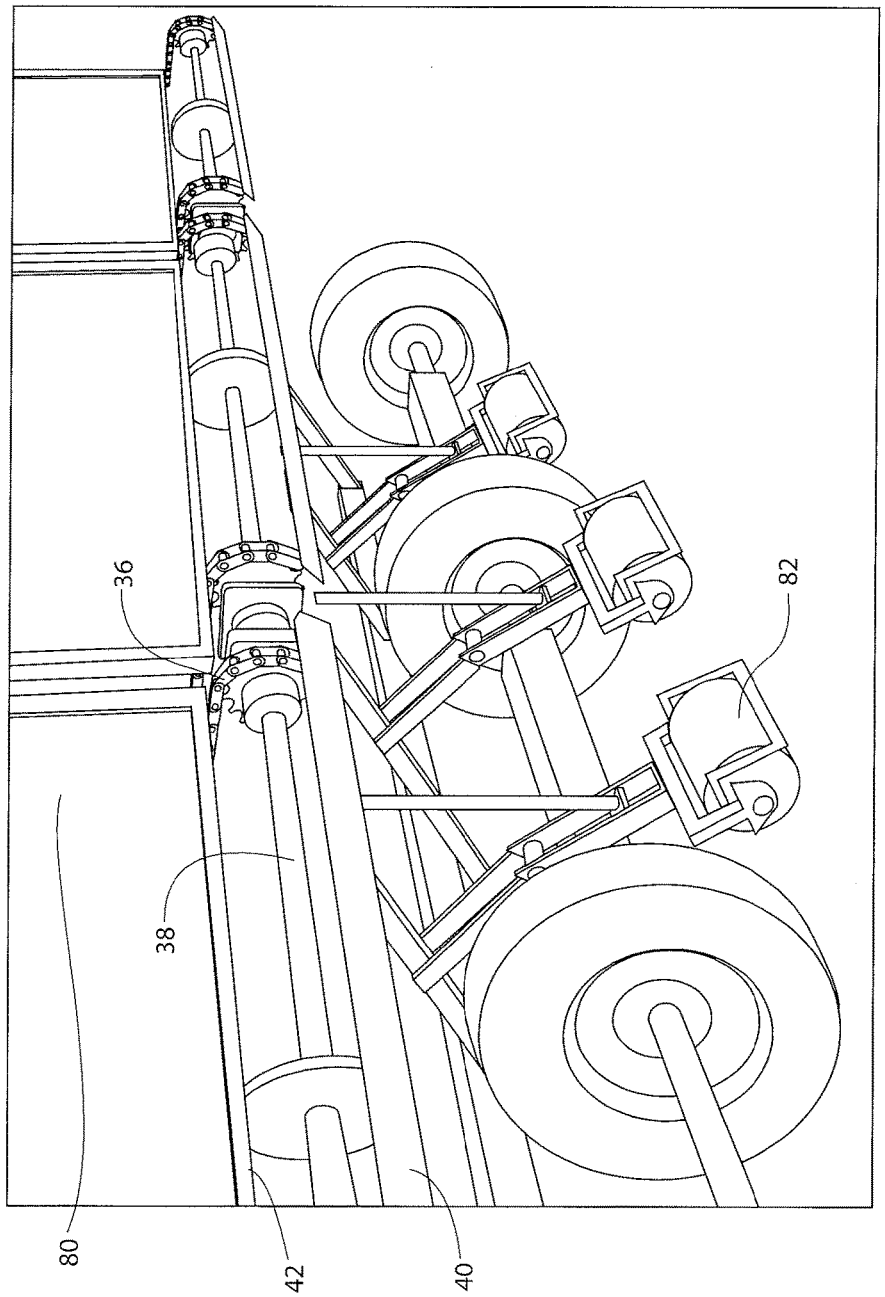
FIG. 9 is view of the rear of the planter showing soil packers to pack soil around the planted rhizomes.

FIG. 9 shows a rear view of the planter with the live bottoms slats 40, the barrier 42, and the axle 38 on which the chains 36 and the live bottom are journaled. It also shows sidewalls for the hopper. Below the hoppers are pressure feet 82 which help to compress the soil over the covered furrow.

FIG. 10 shows a schematic view of the drive mechanism for the various rollers, coordinating the timing of their respective motions, as needed. The chassis drive wheels 14 are linked by sprocket 102 and a chain to a gear box 104. Chains driven by that gear box 104 also drive a gear box 110 and gear box 106. The gear box 106 drives a vertical shaft to turn the accumulator 30 and a further chain drives a sprocket 122 that drives a belt 124 within the chute 32. The belt 124 has flaps 126 that the separated quantities of rhizomes fall on, so they can be lowered toward the furrow under control, helping to assure accurate placement. Since the flaps 126 are driven by drive shafts connected to the sprocket 102, the timing is sequenced with ground speed. The gear box 110 drives a chain around sprocket 108 that drives the live bottom and serves as a gear box to drive the leveling roller 72. Thus, the wheels 14 control the speed of the live bottom, barrel feed and chute flaps, so they move at a pace and sequence to deliver separated quantities of rhizomes for planting in furrows. A different plant spacing along a furrow can be obtained by changing the size of a sprocket. The preferred spacing is 36 inches apart, but other spacings can be used.

The kickback bar motor 55 and barrel feed 28 are driven hydraulically so the speed can be adjusted as needed.

The leveling roller 26 is positioned above the live bottom a distance corresponding to a rhizome length, to pinch rhizomes at the forward side of the hopper and to prevent more than a desired quantity of rhizomes at the forward side of the hopper from discharging from the hopper. The barrel feed 28 has radially extending barbs on its surface, enabling the barbs to engage small quantities of rhizomes discharging from the forward side of the hopper. Thus, when the leveling rollers pinch the material, the barrel feed remove or tear an evenly distributed amount from the live bottom.

Preferably, the chassis has a plurality of accumulators and chutes positioned in a line that extends transversely to the primary direction and spaced at 36 inch centers, but spacings from 33 inches to 39 inches apart on center or other sizes may be useful and are within the scope of the invention. Additionally, as discussed below in connection with FIG. 11, the spacing between rows can be adjusted in some embodiments.

The apparatus enables a method of planting rhizomes. The method can include loading a quantity of rhizomes in a hopper on a chassis, moving the chassis over a field to be planted, while opening furrows in which rhizomes are to be planted as the chassis moves. The method includes transporting the rhizomes in the hopper to a discharge nip, loosening the rhizomes from one another slightly upstream of the discharge nip, pinching the rhizomes at the discharge nip, mechanically pulling plantable amounts of rhizomes forward of the discharge nip. The, plantable amounts are prevented from re-entangling with other rhizomes, and lowered on paddles toward the opened furrows, and covering the dropped rhizomes with soil.

Dropping the plantable amounts of rhizomes in the opened furrows includes dropping a plantable amount of rhizomes in a controlled spacing forward of a just-prior planting of a plantable amount of rhizomes, such as a spacing of 18 inches to 39 inches forward of a just-prior planting of a plantable amount of rhizomes. As seen in FIG. 10, using the flaps 126 in the chutes to lower the rhizomes to the furrow allows additional control. The spacing between planted rhizomes in the furrow can be varied by varying the spacing between flaps 126 that otherwise move at a constant-speed, varying the speed of flaps that remain a constant distance apart, or combinations altered flap spacing and altered flap speed. The speed of the flaps can be changed by changing the gearing of the gear box 106 or sprocket 122 that drives a belt 124.

The adjustability for plant population density adds flexibility to varieties planted. An embodiment of the planter is adjustable for both rhizome numbers per drop, and over all planting density. This spacing and concentration of rhizomes per drop flexibility adds desired planting flexibility from farm to farm. This is a feature that has not been available for ease and flow of material. The adjustability for plant population density adds flexibility to varieties planted.

Figure 11:
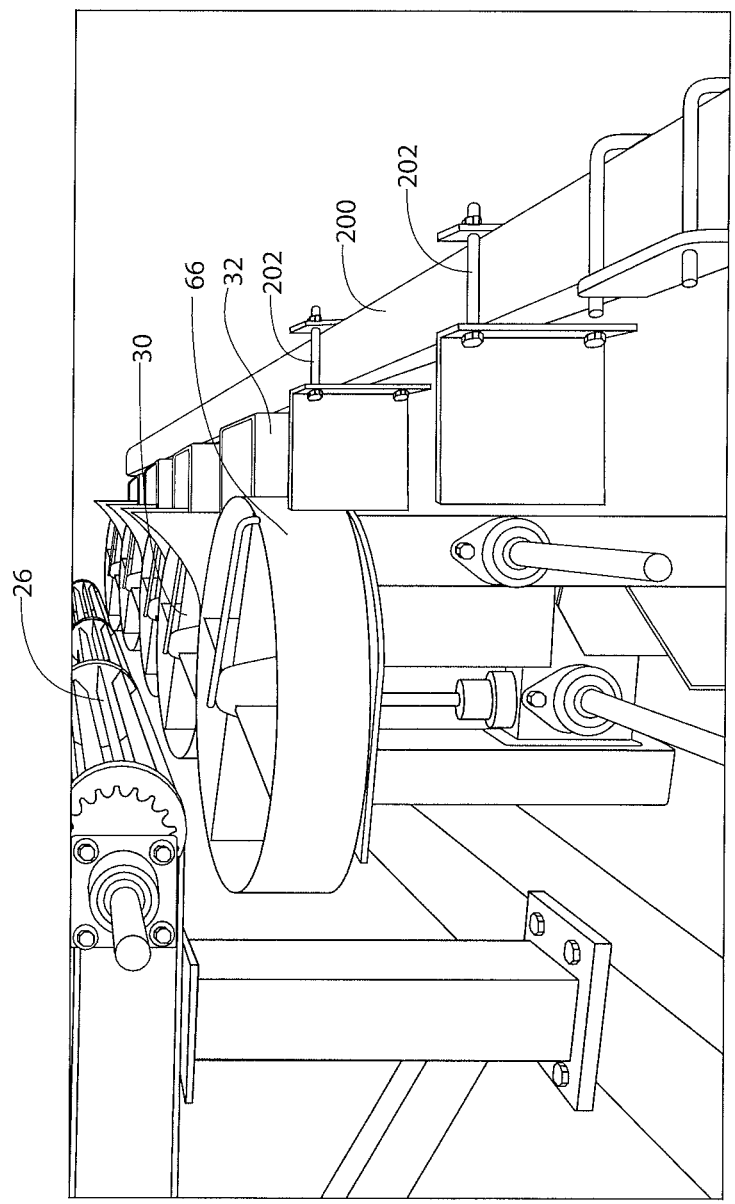
FIG. 11 is a perspective view similar to FIG. 7 of an alternate embodiment allowing variation of row width.

An alternate embodiment is seen in FIG. 11, differing from the prior figures primarily in structural features that permit the cross-machine row spacing to be adjusted. A bar 200 spans the front of the machine. Subassemblies of rhizome-dropping mechanisms are clamped to the bar 200 at desired spacings across the machine, such as by U-shaped clamps 202. Each rhizome-dropping subassembly includes a cylindrical barrier 66 to help contain the rhizomes, with its own accumulator 30 and surface 31 above a chute 32 that has a belt 124 (not visible in FIG. 11) with flaps 126 (not visible in FIG. 11). Drive mechanisms for the accumulator and belt are provided, as before, but with mounting modifications to allow their placement at a desired cross-machine direction to drive their associated accumulator and belt. Similar adjustments to the forward-positioned plow that forms the furrow and the covering disk aft that covers the rhizome can be made in accordance with a revised row spacing, as is within the ordinary skill in the art.

The barrel feed is not visible in FIG. 11, but leveling roller 26 can be seen.

In some embodiments, an average of three rhizomes is planted per drop. At 24×24 inch spacings that would indicate that for 10,890 drops/acre, some 32,670 rhizomes are dropped.

Certain modifications and improvements will occur to those skilled in the art upon reading the foregoing description. It should be understood that all such modifications and improvements have been omitted for the sake of conciseness and readability, but are properly within the scope of the following claims.

What is claimed is:

1. A method of planting rhizomes comprising loading a quantity of rhizomes in a hopper on a chassis, moving the chassis over a field to be planted; while opening furrows in which rhizomes are to be planted,
as the chassis moves, transporting the rhizomes in the hopper to a discharge nip, loosening the rhizomes from one another upstream of the discharge nip,
pinching the rhizomes at the discharge nip,
mechanically pulling amounts of rhizomes forward of the discharge nip,
preventing the amounts of rhizomes from re-entangling with other rhizomes,
dropping the amounts of rhizomes in the opened furrows, and
covering the dropped rhizomes with soil.

2. A method as claimed in claim 1 wherein dropping the amounts of rhizomes in the opened furrows includes dropping an amount of rhizomes in a controlled spacing forward of a just-prior planting of an amount of rhizomes.

3. A method as claimed in claim 1 wherein dropping the amounts of rhizomes in the opened furrows includes dropping an amount of rhizomes at a spacing to yield a number of plants per acre forward of a just-prior planting of an amount of rhizomes.

4. A method as claimed in claim 1 wherein the amount of rhizomes weighs about 1.5 to 2 ounces (50 g) and the rhizomes are about 4 to 5 inches long.

5. A method as claimed in claim 1 wherein the amount of rhizomes weighs about 1.5 to 2 ounces (50 g) and the rhizomes are about 1 to 8 inches long.

* * * * *